W. H. SAWYER.
TREATMENT OF RESINOUS WOODS FOR THE RECOVERY OF RESINS AND TURPENTINE.
APPLICATION FILED FEB. 26, 1919.
1,334,679. Patented Mar. 23, 1920.
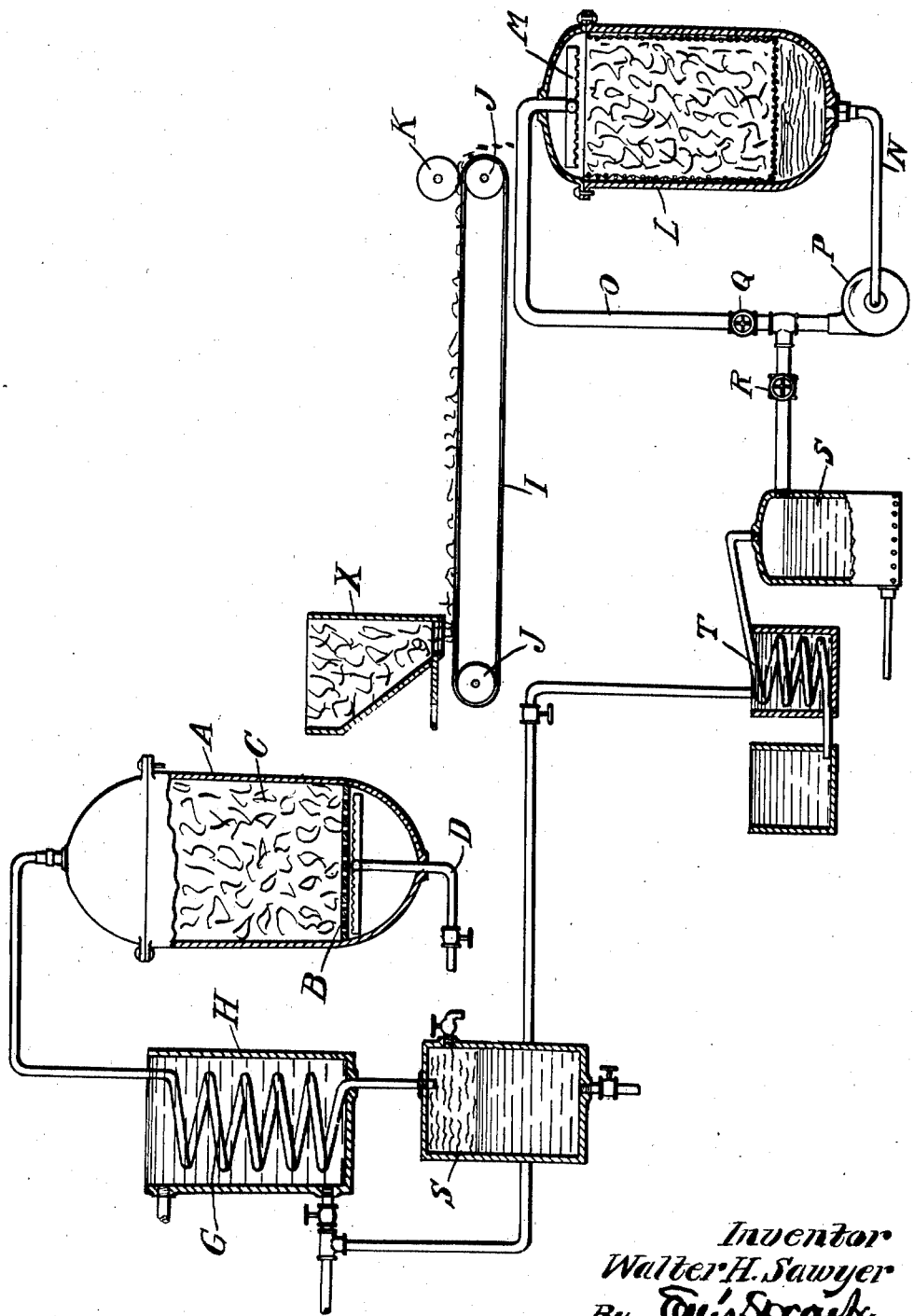
Inventor
Walter H. Sawyer
By Ellis Spear Jr.
Attorney

UNITED STATES PATENT OFFICE.

WALTER H. SAWYER, OF AUBURN, MAINE.

TREATMENT OF RESINOUS WOODS FOR THE RECOVERY OF RESINS AND TURPENTINE.

1,334,679.      Specification of Letters Patent.      Patented Mar. 23, 1920.

Application filed February 26, 1919.  Serial No. 279,311.

*To all whom it may concern:*

Be it known that I, WALTER H. SAWYER, a citizen of the United States, residing at Auburn, county of Androscoggin, State of Maine, have invented certain new and useful Improvements in the Treatment of Resinous Woods for the Recovery of Resins and Turpentine, of which the following is a specification.

My present invention relates to certain methods of recovering resins, turpentines, fibers and other elements from resinous wood such as certain pines and firs of the general character of the Southern pine.

In my present invention I contemplate the recovery by a process which is essentially novel in its cold treatment for resin separation.

In my previous application, Serial No. 278,103, filed Feb. 19, 1919, I have explained a process of recovery in which a hot ammonia solution is used under pressure and while this is advantageous and satisfactory in many respects, my present invention involves certain advantages in regard to other features. These are notably in connection with the purity of the recovered resin, the reduction of time and the minimizing of danger and loss, by avoiding the use of heat and pressure.

In considering my present process, it is to be borne in mind that one of the utilizable recoverable constituents of these woods is long fiber suitable for the manufacture of paper. Although in some instances it may be deemed advisable to practice my invention without regard to the utilization of the residual wood for the manufacture of paper, I shall particularly discuss my invention with a view to the recovery of this fiber for the reason that it is a product of great economical value and importance. The only difference in consideration of my invention if this fiber recovery feature is eliminated is that the wood may be reduced to more comminuted form, such as saw dust, thus speeding up certain steps in the recovery. The essential features of my invention are simple but highly efficacious and in the combination are novel and result in a decided advance in the economical working of the art.

I have discovered that by breaking down the normal cellular structure of the wood as by pressing, crushing or comminuting, it is possible to utilize my ammonia process as a cold process by simple mechanical agitation of the woody material in contact with the alkaline liquor. These features in the process which I shall hereafter describe, combine to produce results which as stated above are of great practical value by reducing materially the loss of solvent and increasing the quantity of resin recovered.

In the practice of my invention where long fiber is to be utilized, I first reduce the wood to chips in the ordinary manner except that I am enabled to use larger chips and thus secure a larger proportion of longer fiber.

These chips I first steam for the recovery of the volatile elements such as turpentine in the ordinary manner. I next remove the water solubles, preferably by hot bath. These water solubles include gums, sugars, some small amount of tannin and coloring matters. This leaves the chips substantially free from those elements which tend to contaminate the resins.

The chips, however, are still practically in the state of their original density and retain substantially their original cellular structure and are thus in a state resistant to the penetration of a resin solvent ordinarily requiring a considerable period of time and a comparatively heavy pressure to effect permeation and removal of the soluble constituents.

I have discovered that by subjecting the chips to a heavy pressure as by passing them through squeeze rolls, I am enabled first to break down the cellular structure, effecting initially a compression of the fibers and a breaking up of the resin formation, after which the fibers automatically expand opening up without permitting any reformation of the cells as such, and without breaking the fibers to any appreciable extent so as to reduce the length.

The chips in this condition are then treated with a cold ammonia solution in which they are preferably violently agitated. Owing to the open nature of the fiber structure, immediate and effective permeation results and a rapid formation of ammonium resinate to a very complete degree is effected. The solution of ammonium resinate is recovered and the ammonia gas driven off by means of heat. The resinate remaining in the wood is then removed by simple washing with water, and from this liquor ammonia is immediately recoverable by volatilization. The resultant resin is comparatively uncontaminated with foreign matter, and such slight contamination as exists may be removed by dissolving the resin in a solvent in which the foreign matter is insoluble with subsequent straining, or filter pressing, and evaporation of solvent. The resin is left in a pure condition.

The chips are substantially free from the bulk of the retardents to pulp making and are in a condition, owing to the reëxpansion of the fiber and the removal of the resin, in which they are immediately and economically responsive to the liquor of the paper making process to be employed.

It is also particularly free from danger of accident in operation and of great increase in operating profit.

My process is capable of practice in a variety of simple apparatus. For the purposes of illustration of the present invention I have shown somewhat diagrammatically in the accompanying drawing a plant comprising a steam chamber A in which the body of chips C is supported on a perforated or false bottom B. Steam passes by a pipe D through the bottom of the tank A, through the chip charge C and out the pipe F to a condenser coil G in a tank H where it is condensed and drawn off into a separating tank S. Chips C in the tank A after steaming are dropped from a hopper X on an apron I running on rolls J and thus fed under a crushing roll K which thoroughly breaks down the chips and compresses them as heretofore described.

From the roll K the chips are fed into a tank L in which they receive the cold processing. The alkaline solution is fed to the tank L by a pump P through a pipe O into the top of the tank from a nozzle M and drawn from the bottom of the tank through a pipe N, thus being circulated to effect the desired extraction. In this tank the compressed chips are rapidly attacked by the cold solvent on account of their previous compression. When the proper degree of extraction has been effected valves Q and R are turned and the liquor drawn off for resin separation in the tank S and solvent recovery in the condenser T or other apparatus suitable for the treatment of the solvent used.

In case the fiber is not to be regarded as a utilizable product the wood may be immediately reduced to saw dust or may be comminuted either before or after the preliminary washings.

The recovery of turpentines, resins and pulp material from the stumps of resinous woods is an economic process much desired. One deterent of their utilization is the presence of charcoal on that portion of the stumps remaining above ground resulting from various wood fires. The presence of this charcoal reduces the value of the fiber for paper making purposes on account of the black specks which will be present. I have found that if the wood has been chipped as in the ordinary process of preparing wood for the removal of resins and for the purpose of preparation of the fiber, that if the chips are crushed through squeeze rolls while they are still dry, the charcoal, being very brittle, is broken up into a fine dust, the cellular structure of the wood fiber is eliminated and the resins in the wood are also crushed. On the subsequent treatment of the chips with a solvent, the resins are easily removed both from the wood chips and from any adhering charcoal, and subsequent operation of dusting after drying or washing of the fiber over fine screens will remove the charcoal, giving as a result a fiber fit for the manufacture of a good grade of paper.

These and various other modifications may all be practised without departing from the spirit of my invention if within the limits of the appended claims.

What I therefore claim and desire to secure by Letters Patent is:

1. The method of treating resinous woods consisting in chipping, in breaking down the cellular structure substantially without reducing the fiber length, in treating with a cold volatile alkaline solvent, in separating the alkaline solvent from the wood and in volatilizing the alkali.

2. The method of treating resinous woods consisting in mechanically compressing the wood to break down the cellular structure, permitting fibrous elements to expand, in treating with a cold volatile alkaline solvent, in separating the alkaline solvent from the wood and in volatilizing the alkali.

3. The method of treating resinous woods consisting in removing the terpenes and water solubles, in breaking down the cellular structure, in treating with a volatile alkaline solution, and in removing the resinate and in volatilizing the alkali.

4. The method of treating resinous woods consisting in mechanically reducing the normal cellular structure of growth, in treating with a cold volatile alkaline solvent with agitation and in separating the alkaline solvent from the wood.

5. The method of treating resinous woods consisting in mechanically breaking down the cellular structure and in removing the resins by a solvent solution.

6. The method of treating charred resinous woods for pulp consisting in breaking down the cellular structure and crumbling the char, in extracting the resins and in removing the crumbled char from the undecomposed woody material.

In testimony whereof I affix my signature in presence of two witnesses.

WALTER H. SAWYER.

Witnesses:
VICTORIA LOWDEN,
GEO. B. RAWLINGS.